US009569611B2

(12) United States Patent
Sun

(10) Patent No.: US 9,569,611 B2
(45) Date of Patent: Feb. 14, 2017

(54) ELECTRONIC APPARATUS AND SCREEN UNLOCK METHOD THEREOF

(71) Applicant: Wistron Corporation, New Taipei (TW)

(72) Inventor: Beryl Sun, New Taipei (TW)

(73) Assignee: Wistron Corporation, New Taipei (TW)

( * ) Notice: Subject to any disclaimer, the term of this patent is extended or adjusted under 35 U.S.C. 154(b) by 16 days.

(21) Appl. No.: 14/660,945

(22) Filed: Mar. 18, 2015

(65) Prior Publication Data

US 2016/0188870 A1    Jun. 30, 2016

(51) Int. Cl.
G06F 21/00 (2013.01)
G06F 21/45 (2013.01)
G06F 21/31 (2013.01)
H04L 29/06 (2006.01)

(52) U.S. Cl.
CPC ............. *G06F 21/45* (2013.01); *G06F 21/313* (2013.01); *H04L 63/06* (2013.01); *G06F 2221/2117* (2013.01); *G06F 2221/2131* (2013.01)

(58) Field of Classification Search
CPC ........... G06F 21/44; G06F 21/31; G06F 21/34
USPC .......................................................... 726/18
See application file for complete search history.

(56) References Cited

U.S. PATENT DOCUMENTS

2007/0169174 A1* 7/2007 Critten .................... G06F 21/34 726/3
2015/0072648 A1* 3/2015 Bravo .................... H04W 12/08 455/411

* cited by examiner

*Primary Examiner* — Syed Zaidi
(74) *Attorney, Agent, or Firm* — Jianq Chyun IP Office

(57) ABSTRACT

An electronic apparatus and a screen unlock method thereof are provided in the invention. The method includes the following steps. First, when a screen of an electronic apparatus is locked, a password unlock option is displayed on the screen, where the password unlock option is configured to unlock the screen via a preset password. A password delete option is displayed on the screen, where the password delete option is configured to delete the preset password to unlock the screen. In response to a select operation on the password delete option performed by a user, a random code is generated and set to a preset account. Next, an input code input by the user is received, and whether the input code and the random code are identical is determined. When the input code and the random code are identical, the preset password would be deleted, and the screen would be unlocked.

12 Claims, 7 Drawing Sheets

ELECTRONIC APPARATUS AND SCREEN UNLOCK METHOD THEREOF

CROSS-REFERENCE TO RELATED APPLICATION

This application claims the priority benefit of China application serial no. 201410818523.7, filed on Dec. 24, 2014. The entirety of the above-mentioned patent application is hereby incorporated by reference herein and made a part of this specification.

BACKGROUND OF THE INVENTION

1. Field of the Invention

The present invention generally relates to an electronic apparatus and a control method thereof, in particular, to an electronic apparatus and a screen unlock method thereof.

2. Description of Related Art

To accommodate people's busy lifestyles, mobile electronic apparatuses such as personal digital assistants, smart phones, tabular computers have become indispensable. As an example, a smart phone equipped with a touch screen may not only include each feature provided by a traditional communication apparatus, but may also include a built-in operation system that carries out versatile tasks such as document editing, e-mail serving, web serving, multimedia playing, photo shooting, and instant communication, and thus its usage has surpassed all the other electronic apparatuses.

As the security of digital contents has been raised, a screen lock mechanism is built in the smart phone to secure personal privacy. When the user turns off the screen of the smart phone or when the smart phone has been idle for a period of time, the smart phone may enter a screen lock state. When the user desires to use the smart phone again, a certain lock operation needs to be performed on the screen. The existing screen unlock mechanisms include fingerprint unlock, facial recognition unlock, voice recognition unlock, password unlock, pattern drawing unlock, and so forth. However, for the fingerprint unlock, the facial recognition unlock, and the voice recognition unlock, failure recognition may result in unsuccessful unlock attempts. For the password unlock or the pattern drawing unlock, the user may forget the password or the pattern due to its complexity. Hence, one solution is to brute force the preset password/pattern or to restore the smart phone to factory default settings so as to unlock the screen via the default password. However, the former solution requires to manually enter all possible passwords. The latter solution may loss all data stored in the smart phone, and thus the data may needs to be backed up in advance. Consequently, the entire unlocking process may be time-consuming and cumbersome.

SUMMARY OF THE INVENTION

Accordingly, the invention is directed to an electronic apparatus and a screen unlock method thereof. While the electronic apparatus is in a screen lock state, in case the user forgets a password or fails to unlock the screen through the preset password, the screen could be unlocked through a simple, fast, and secure approach.

The invention is directed to a screen unlock method of an electronic apparatus, adapted to an electronic apparatus having a screen, an input unit, and a communication unit. The method includes the following steps. While the electronic apparatus is in a screen lock state, a password unlock option is displayed on a display of the screen, and a password delete option is further displayed on the display of the screen, where the password unlock option is configured to release the screen lock state via a preset password, and the password delete option is configured to release the screen lock state by deleting the preset password. In response to a select operation performed on the password delete option by a user, a random code is generated and sent a random code to a preset account. Next, an input code entered by the user is received and whether the input code is identical to the random code is determined. When the input code is identical to the random code, the preset password would be deleted to release the screen lock state.

According to an embodiment of the invention, while the electronic apparatus is in the screen lock state, the steps of displaying the password unlock option and displaying the password delete option on the display of the screen are as follows. The password unlock option is first displayed on the display. Next, an input password entered by the user is received and whether the input password is identical to the preset password is determined. When the input password is identical to the preset password, the screen lock state is released. When the input password is not identical to the preset password, at least the password delete option is displayed on the display.

According to an embodiment of the invention, when the input password is not identical to the preset password, the step of at least displaying the password delete option on the display further includes displaying a hint message on the display to prompt the user to enter an account, where the random code is generated and sent to the preset account only when the account is determined to be identical to the preset account.

According to an embodiment of the invention, the preset account is a mobile phone number, an e-mail account, a social website account, or an instant messaging account of a contact person.

According to an embodiment of the invention, the preset account is an e-mail account, a social website account, an instant messaging account, or a phone number of a mobile phone of the user, wherein the mobile phone is different from the electronic apparatus.

The invention is also directed to an electronic apparatus having a screen, an input unit, a communication unit, a storage unit, and at least one processing unit, where the at least one processing unit is coupled to the screen, the input unit, the communication unit, and the storage unit. The storage unit is configured to record a plurality of modules. The processing unit is configured to access and execute the modules stored in the storage unit. The modules include an activating module, a positioning module, a determination module, and a displaying module. The modules include a displaying module, a code generating module, a communication managing module, a determining module, and an unlocking module. While the electronic apparatus is in a screen unlock state, the displaying module is configured to display a password unlock option and a password delete option, where the password unlock option is configured to unlock the screen via a preset password, and the password delete option is configured to unlock the screen by deleting the preset password. In response to a select operation performed on the password delete option by a user through the input unit, the code generating module is configured to generate a random code. The communication managing module is configured to send the random code to a preset account by using the communication unit. The determining module is configured to receive an input password entered by the user and determine whether the input password is identical to the preset password. When the input code is identical to the random code, the unlocking module is configured to delete the preset password to release the screen lock state.

In summary, in the screen unlock method and the electronic apparatus proposed in the invention, when the user forgets a preset password or fails to unlock the screen through the preset password, a random code may be sent to a preset account. After the user obtains the random code through other apparatuses and enters the random code into the electronic apparatus, the preset password of the electronic apparatus may be deleted to release the screen lock state. In the invention, the screen could be unlocked through a simple, fast, and secure approach, where the user neither needs to brute force the preset password manually nor needs to back up the data stored in the electronic apparatus in advance.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
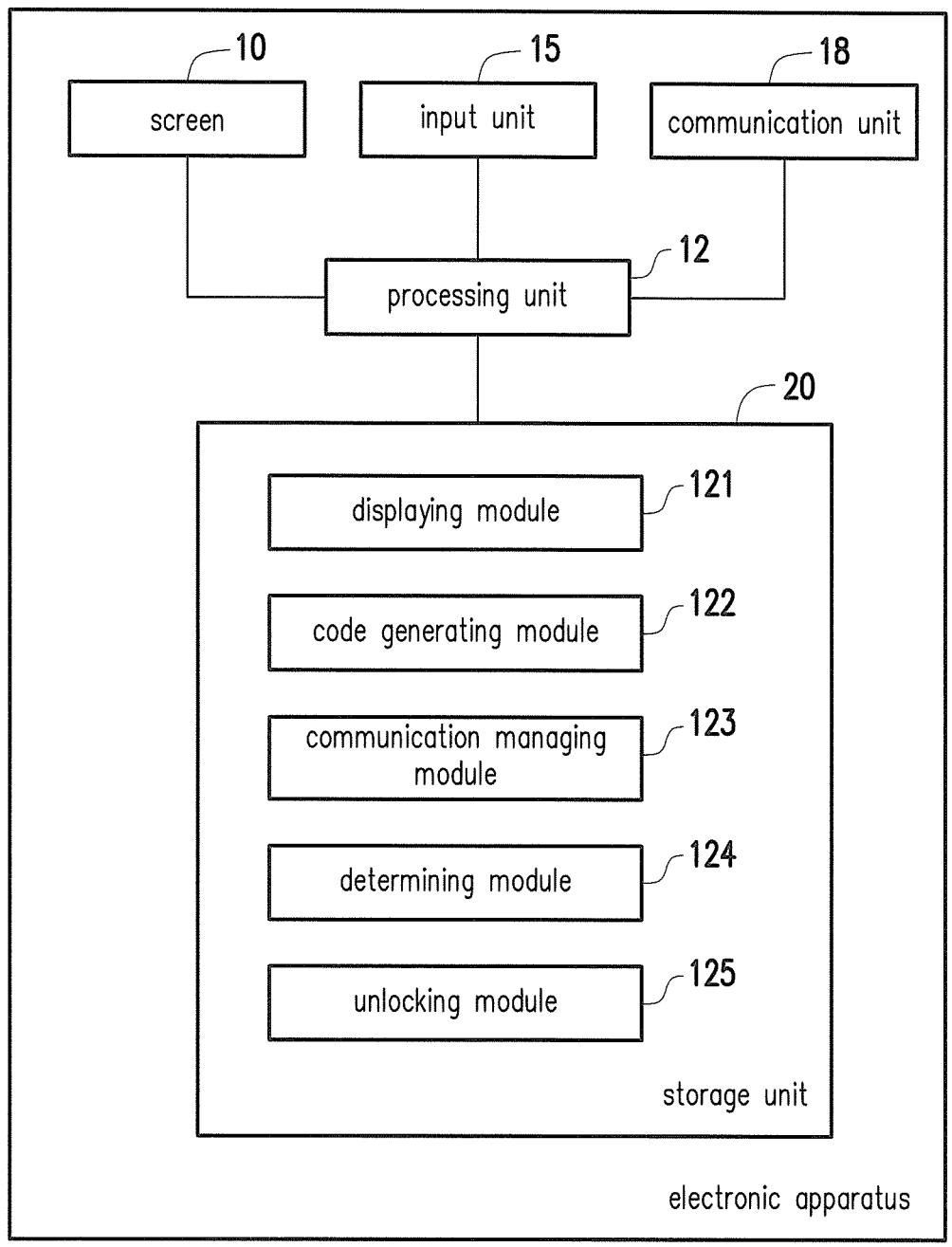
FIG. 1 illustrates a block diagram of an electronic apparatus according to an embodiment of the invention.

In order to avoid a cumbersome process when the user forgets a preset password for releasing a screen unlock state of an electronic apparatus, the main concept of the invention is to send a random code to a preset account, and the user would obtain the random code from other devices and enter the random code for verification. When the verification succeeds, the preset password would be deleted and the screen unlock state would be released.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the invention.

FIG. 1 illustrates a block diagram of an electronic apparatus according to an embodiment of the invention. It should, however, be noted that this is merely an illustrative example and the invention is not limited in this regard. All components of the electronic apparatus and their configurations are first introduced in FIG. 1. The detailed functionalities of the components are disclosed along with FIG. 2.

Referring to FIG. 1, an electronic apparatus 100 includes a touch screen 10, an input unit 15, a communication unit 18, a storage unit 20, and at least one processing unit 12. In the present embodiment, the electronic apparatus 100 may be a mobile phone, a smart phone, a tabular computer, a desktop computer, a personal digital assistant, an e-book, and so forth. The invention is not limited herein.

The screen 10 is configured to display a frame output by the electronic apparatus 100 for the user. In the present embodiment, the screen 10 may be a liquid crystal display (LCD), a light-emitting diode (LED) display, a field emission display (FED) or other types of displays. The input unit 15 is configured to provide an input feature for the user to operate the electronic apparatus 100 and may be an input device of the electronic apparatus 100 such as an external or built-in keyboard, mouse, stylus pen, touch panel, trackball, and so forth. In an embodiment, the screen 10 and the input unit 15 may be integrated as a touch screen (e.g. a resistive touch screen or a capacitive touch screen) which is configured to receive a touch operation of the user.

The communication unit 18 is configured to receive information through phone calls, messages, e-mails, and web services. The communication unit 18 may be a component capable of supporting wireless internet access such as WiMAX, Wi-Fi, 2G, 3G, or 4G, wired internet access such as ADSL or optical fibre network, or mobile communication such as GSM, PHS, or CDMA. The invention is not limited herein.

The storage unit 20 may be one or a combination of a stationary or mobile random access memory (RAM), a read-only memory (ROM), a flash memory, a hard drive or other similar devices. The storage unit 20 is configured to record a plurality of modules executable by the processing unit 12. The modules include a displaying module 121, a code generating module 122, a communicating module 123, a determining module 124, and an unlocking module 125, where the modules may be loaded into the processing unit 12 for performing the proposed screen unlock method.

The processing unit 12 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of the aforesaid devices. The processing unit 12 is coupled to the screen 10, the input unit 15, the communicating unit 18, and the storage unit 20, and configured to perform the proposed screen unlock method.

Figure 2:
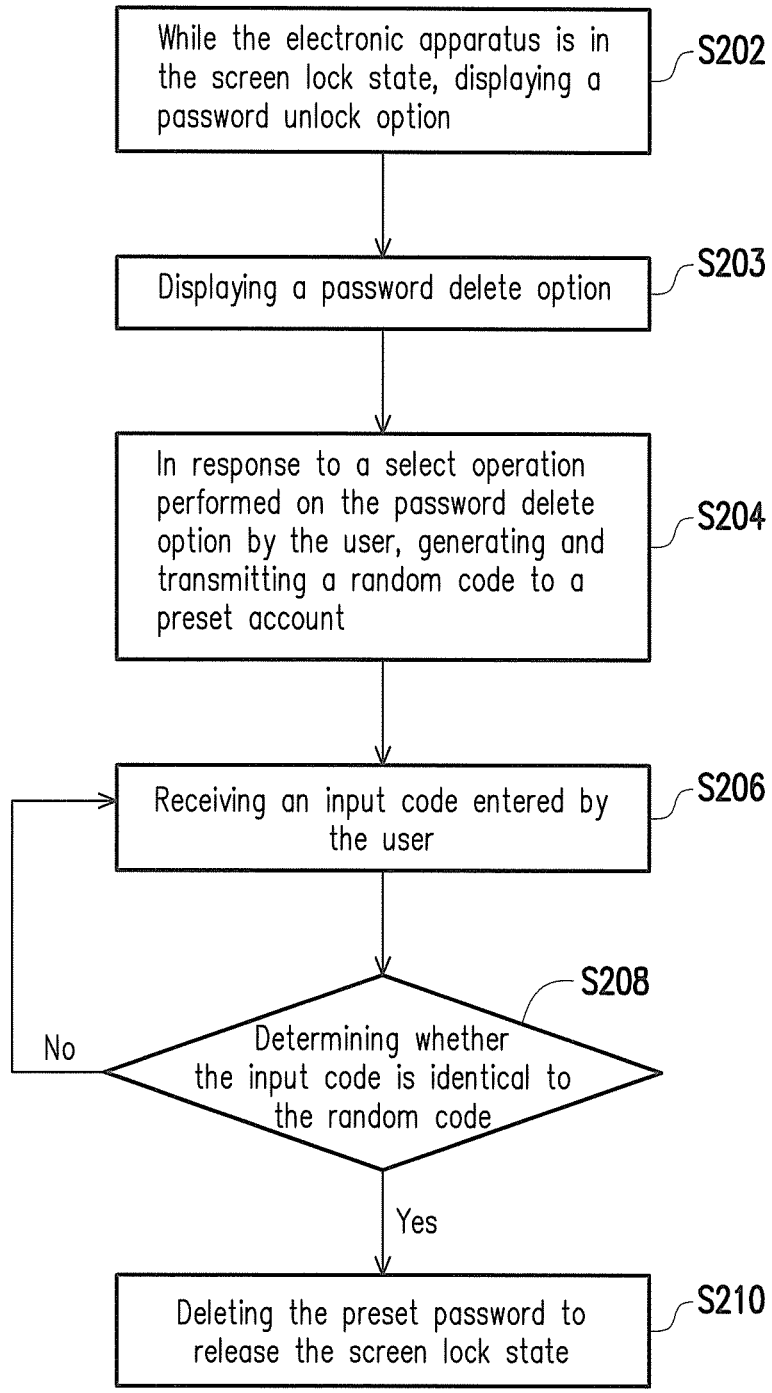
FIG. 2 illustrates a flowchart of a screen unlock method according to an embodiment of the invention.

FIG. 2 illustrates a flowchart of a screen unlock method according to an embodiment of the invention. The method in the present embodiment may be implemented by the electronic apparatus 100 in FIG. 1. Detailed steps of the proposed method would be illustrated along with the components of the electronic apparatus 100.

In the present embodiment, the electronic apparatus 100 may include various operating states such as a screen lock state and a screen unlock state. While the electronic apparatus 100 is in the screen lock state, it is still operating and yet may only respond to certain predefined user inputs. For example, the user may place an emergency call or enter a password to unlock the screen 10. On the other hand, while the electronic apparatus 100 is in the screen unlock state, the electronic apparatus 100 may respond to all user inputs.

Referring to FIG. 2, while the electronic apparatus is in the screen lock state, the displaying module 121 displays a password unlock option on the display (Step S202) and displays a password delete option on the display (Step S203). The password delete option is configured to unlock the screen 10 via a preset password such as a fingerprint, face recognition, voice recognition, a character passcode, a drawing pattern, and so forth. On the other hand, the password delete option is configured to unlock the screen 10 by deleting the preset password.

In the present embodiment, when the electronic apparatus 100 is in the screen lock state, the displaying module 121 may first display the ordinary password unlock option in order to keep the display of the screen 10 simple. The determining module 124 may determine whether a password entered by the user via the input unit 15 (referred to as an "input password" hereinafter) is identical to a preset password. When the determining module 125 determines that the input password is identical to the preset password, the unlocking module 125 may release the screen lock state of the electronic apparatus 100, and the electronic apparatus 100 may enter the screen unlock state.

On the other hand, when the determining module 124 determines that the input password is not identical to the preset password, the displaying module 121 may concurrently display the password unlock option and the password delete option on the display, and the user may decide whether to unlock the screen 10 through re-entering the password or through deleting the preset password. In another embodiment, the displaying module 121 may concurrently display the password unlock option and the password delete option on the display when the user fails password attempts for a certain amount of times (e.g. three times). The invention is not limited herein. Yet in another embodiment, when the determining module 124 determines that the input password is not identical to the preset password or user fails password attempts for a certain amount of times (e.g. three times), the displaying module 121 may only display the password delete option on the display.

Next, in response to a select operation performed on the password delete option by the user through the input unit 15, the code generating module 122 generates a random code, and the communication managing module 123 sends the random code to a preset account by using the communication unit 18 (Step S204). To be specific, when the user selects the password delete option, the code generating module 122 may randomly generate a string and set it as the random code. Next, the communication managing module 123 may send the random code to the preset account set by the user through the communication unit 18. The preset account herein may be an e-mail account, a social website account, an instant messaging account or other communication accounts of the user of the electronic apparatus 100, or may be a mobile phone number, an e-mail account, a social website account, an instant messaging account or other communication accounts of a contact person. Moreover, when the electronic apparatus 100 is one of the mobile phones owned by the user, the preset account may also be a phone number of another mobile phone owned by the user.

In an embodiment, before the electronic apparatus 100 enters the screen lock state, the preset account has been preset by the user and stored in the storage unit 20. Thus, when the code generating module 122 generates the random code, the communication managing module 123 may send the random code to the preset account.

In another embodiment, when the user selects the password delete option, the displaying module 121 may first display a hint message on the display to prompt the user to enter an account for security purposes. The code generating module 122 may only generate the random code only when determining that the account entered by the user is identical to the preset account, and the communication managing module 123 may send the generated random account to the preset account through the communication unit 18.

In another embodiment, assume that the preset account has not yet been set or the preset account stored in the storage unit 20 has been deactivated before the electronic apparatus 100 enters the screen lock state. Before the random code is generated, the displaying module 121 may display another hint message on the screen 10 to prompt the user to enter a new account. When the communication managing module 123 receives the new account entered by the user, it may set the new account as the preset account. In other word, if there already exists a preset account in the storage unit 20, such preset account may be replaced by the new account, and the communication managing module 123 may send the random code to the new account.

Next, the determining module 124 receives an input code entered by the user through the input unit 15 (Step S206) and determines whether the input code is identical to the random code (Step S208). The user of the electronic apparatus 100 may obtain the random code through different approaches and enter the obtained random code through the input unit 15. The determining module 124 may further determine whether the input code is identical to the random code generated by the code generating module 122.

In an embodiment, when the preset account is, for example, the e-mail account of the user of the electronic apparatus 100, the user may obtain the random code by checking an e-mail through another electronic apparatus.

In another embodiment, when the preset account is, for example, a contact person's phone number, the communication managing module 123 may send the random code as a text message to the contact person's phone number, and the user may contact the contact person to obtain the random code. The communication managing module 123 may further provide a communication feature between the electronic apparatus 100 and a contact device of the contact person to obtain the random code with conveniences. For example, the communication managing module 123 may allow the electronic apparatus 100 to send a text message or place a phone call to the contact device.

When the determining module 124 determines that the input code is identical to the random code, the unlocking module 124 would delete the preset password to release the screen lock state (Step S208). In other words, when the input code and the random code are identical, the unlocking module 125 may delete the preset password, and the screen 10 of the electronic apparatus 100 may thus be automatically unlocked to enter the screen unlock state.

On the other hand, when the determining module 124 determines that the input code is not identical to the random code, the screen unlock method may return to Step S206, and the determining module 124 may receive another input code re-entered by the user through the input unit 15.

FIG. 3A-3E illustrate a scenario in which a screen unlock method according to an embodiment of the invention is performed.

Figure 3A:
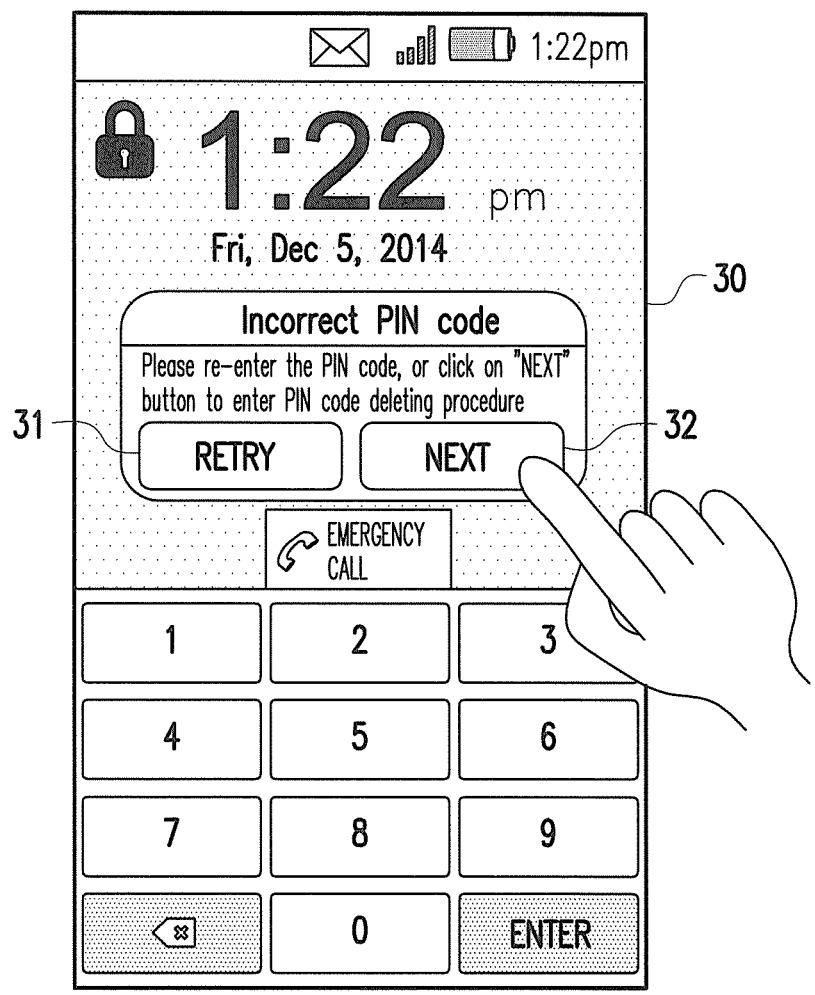
FIG. 3A-3E illustrate a scenario in which a screen unlock method according to an embodiment of the invention is performed.

Referring to FIG. 3A, the preset password in the present embodiment is a PIN code. When the user enters an incorrect password to unlock the electronic apparatus 100, the display 30 may present two options, a RETRY button 31 and a NEXT button 32. The RETRY button 31 provides the user to re-enter the PIN code to unlock the screen 10. The NEXT button 32 provides the user to unlock the screen 10 through deleting the PIN code. After the user clicks on the NEXT button 32, a display 40 as illustrated in FIG. 3B may be presented on the screen 10.

Figure 3B:
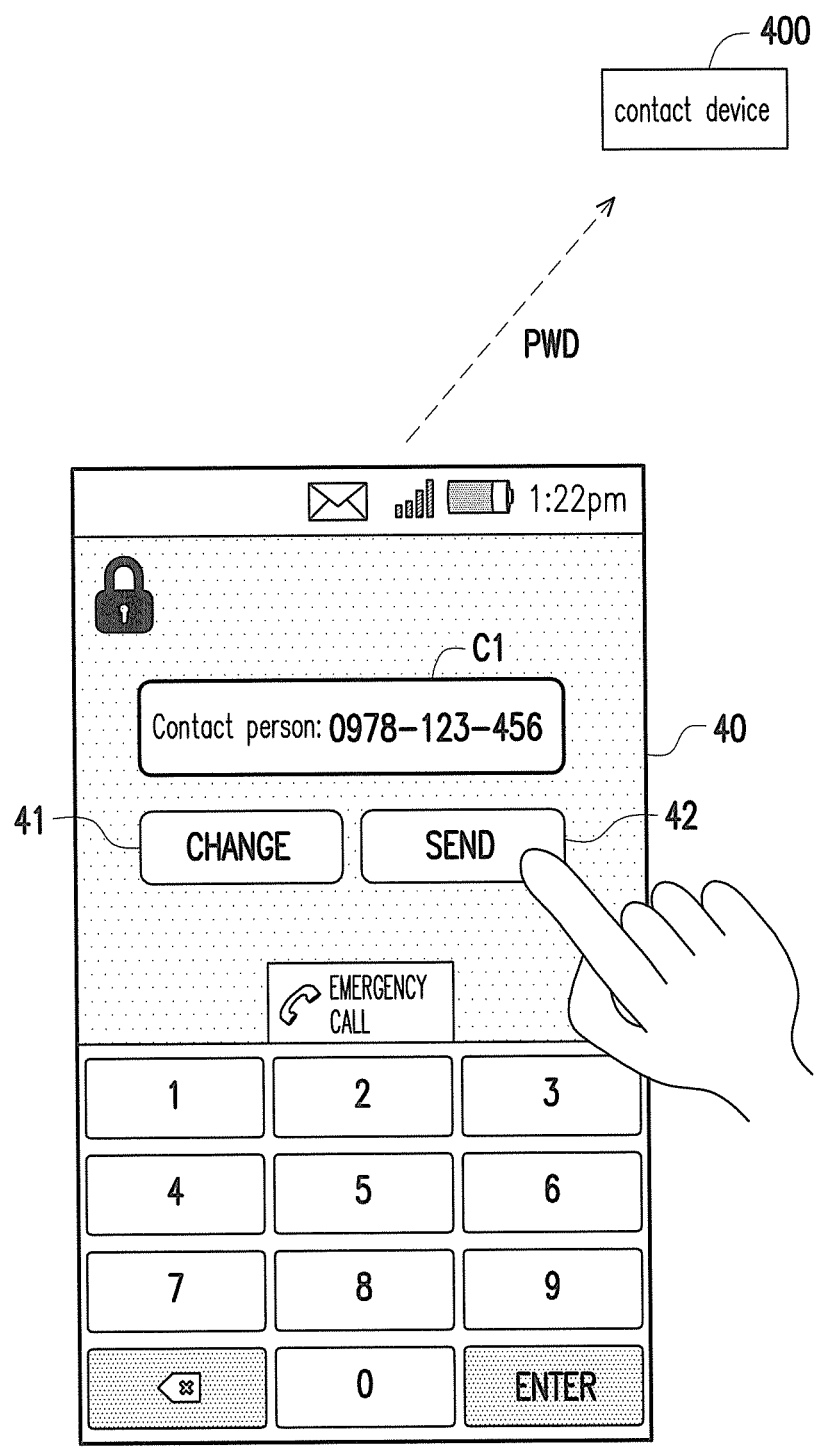

Referring to FIG. 3B, a preset account is displayed in a field C1 of the display 40. In another embodiment, the preset account may not be displayed directly in the field C1.

Instead, a hint message prompting the user to enter the preset account may be displayed in the field C1. In other word, such preset account is invisible and is only known by the user for security purposes. The preset account in the present embodiment is a phone number of a contact person. The user may click on a CHANGE button 41 to change the preset account in the field C1. The user may also click on a SEND button 42 to generate and send a random code PWD to a contact device 400 of the contact person. After the user clicks on the SEND button 42, a display 50 as illustrated in FIG. 3C may be presented on the screen 10.

Figure 3C:
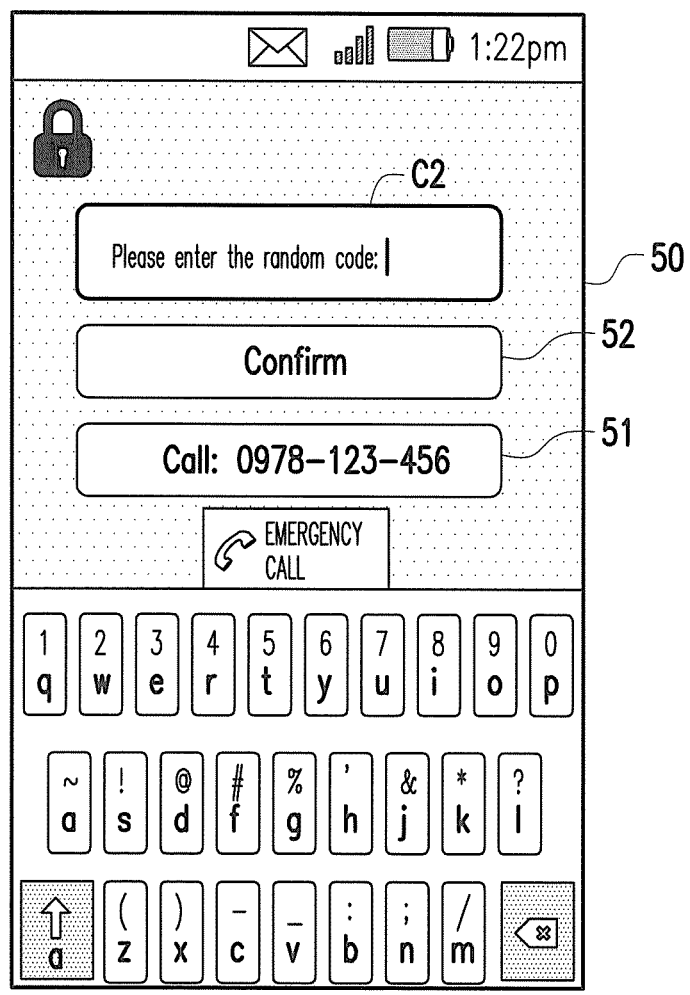

Referring to FIG. 3C, a hint message prompting the user to enter the random code is displayed in a field C2 of the display 50. In an embodiment, when the contact person is nearby, the user may personally ask the contact person for the random code and enter the random code in the field C2. In another embodiment, the user may click on a CALL button 51 to initiate a phone conversation with the contact person of the contact device 400 in FIG. 3B and ask for the random code.

Figure 3D:
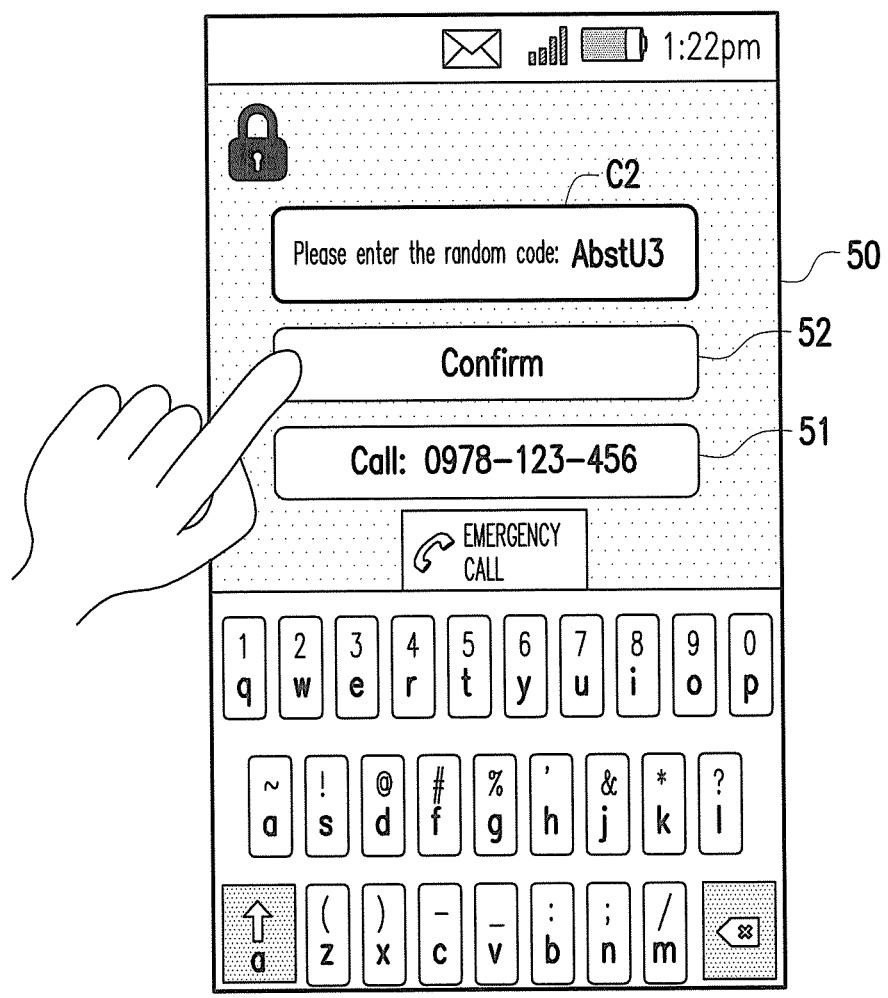
Figure 3E:
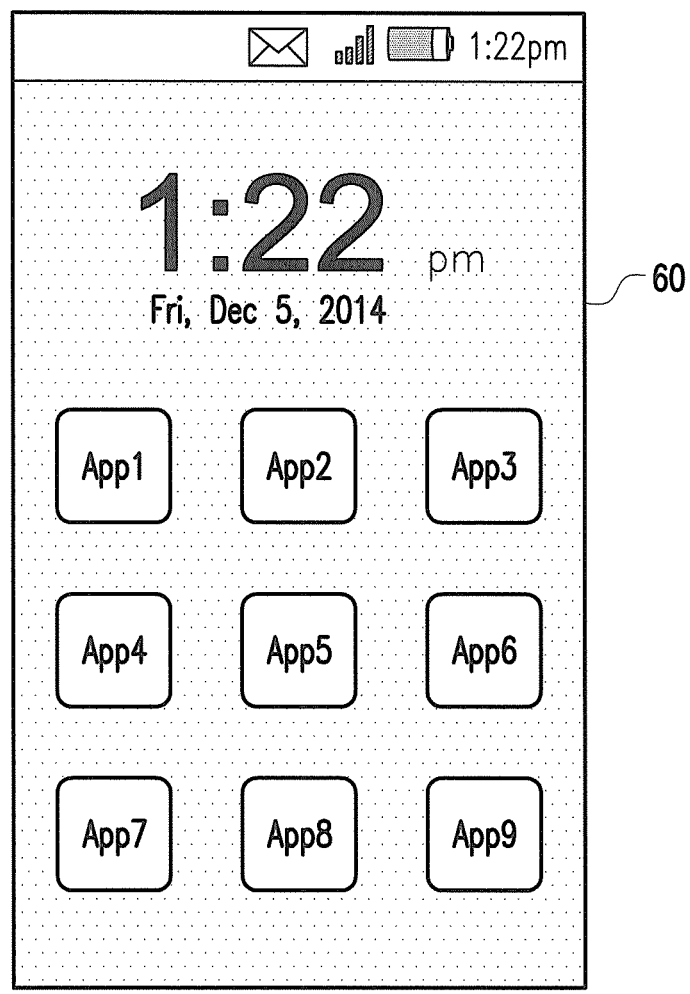

Referring to FIG. 3D, after the user enters the random code in the field C2 and clicks on a CONFIRM button 52, the PIN code stored in the electronic apparatus 100 may be deleted and the screen unlock state is released. Thereafter, the electronic apparatus 100 may enter the Home screen such as a display 60 as illustrate in FIG. 3E.

In summary, in the screen unlock method and the electronic apparatus proposed in the invention, when the user forgets a preset password or fails to unlock the screen through the preset password, a random code may be sent to a preset account. After the user obtains the random code through other apparatuses and enters the random code into the electronic apparatus, the preset password of the electronic apparatus may be deleted to release the screen lock state. In the invention, the screen could be unlocked through a simple, fast, and secure approach, where the user neither needs to brute force the preset password manually nor needs to back up the data stored in the electronic apparatus in advance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A screen unlock method, adapted to an electronic apparatus having a screen, an input unit, and a communication unit, comprising:
   while the electronic apparatus is in a screen lock state, displaying a password unlock option on a display of the screen, wherein the password unlock option is configured to release the screen lock state via a preset password;
   displaying a password delete option on the display of the screen, wherein the password delete option is configured to release the screen lock state by deleting the preset password;
   in response to a select operation performed on the password delete option by a user, displaying a hint message on the display to prompt the user to enter a new account, receiving the new account entered by the user, setting and storing the new account as a preset account, and generating and sending a random code to the preset account;
   receiving an input code entered by the user and determining whether the input code is identical to the random code, wherein the input code is obtained from the preset account by the user through another device; and
   deleting the preset password to release the screen lock state when the input code is identical to the random code.

2. The screen unlock method of claim 1, wherein while the electronic apparatus is in the screen lock state, the steps of displaying the password unlock option and displaying the password delete option on the display of the screen comprise:
   displaying the password unlock option on the display;
   receiving an input password entered by the user and determining whether the input password is identical to the preset password;
   when the input password is identical to the preset password, releasing the screen lock state; and
   when the input password is not identical to the preset password, at least displaying the password delete option on the display.

3. The screen unlock method of claim 2, wherein when the input password is not identical to the preset password, the step of at least displaying the password delete option on the display comprises:
   displaying the password unlock option and the password delete option on the display concurrently.

4. The screen unlock method of claim 1, wherein the preset account is a mobile phone number, an e-mail account, a social website account, or an instant messaging account of a contact person.

5. The screen unlock method of claim 4, wherein after the step of sending the random code to the preset account, the screen unlock method further comprises:
   providing a communication feature between the electronic apparatus and a contact device of the contact person to obtain the random code.

6. The screen unlock method of claim 1, wherein the preset account is an e-mail account, a social website account, an instant messaging account, or a phone number of a mobile phone of the user, wherein the mobile phone is different from the electronic apparatus.

7. An electronic apparatus comprising:
   a screen;
   an input unit;
   a communication unit;
   a storage unit, recording a plurality of modules; and
   at least one processing unit, coupled to the screen, the input unit, the communication unit, and the storage unit, accessing and executing the modules recorded in the storage unit, wherein the modules comprise:
      a displaying module, displaying a password unlock option and a password delete option while the electronic apparatus is in a screen lock state, wherein the password unlock option is configured to unlock the screen via a preset password, and wherein the password delete option is configured to unlock the screen by deleting the preset password;
      a code generating module;
      a communication managing module,
         wherein in response to a select operation performed on the password delete option by a user, the displaying module displays a hint message on the display to prompt the user to enter a new account, the communication managing module receives the new account entered by the user and sets and stores the new account as a preset account, the code generating module generates a random code, and the communication managing module sends the random code to the preset account by using the communication unit;

a determining module, receiving an input code entered by the user and determining whether the input code is identical to the preset password, wherein the input code is obtained from the preset account by the user through another device; and an unlocking module, deleting the preset password to release the screen lock state when the input code is identical to the random code.

8. The electronic apparatus of claim 7, wherein the displaying module first displays the password unlock option on the display, and the determining module receives an input password entered by the user and determines whether the input password is identical to the preset password, wherein if yes, the unlocking module releases the screen lock state, and wherein if not, the displaying module at least displays the password delete option on the display.

9. The electronic apparatus of claim 8, wherein when the input password is not identical to the preset password, the displaying module displays the password unlock option and the password delete option on the display concurrently.

10. The electronic apparatus of claim 7, wherein the preset account is a mobile phone number, an e-mail account, a social website account, or an instant messaging account of a contact person.

11. The electronic apparatus of claim 10, wherein the communication managing module further provides a communication feature between the electronic apparatus and a contact device of the contact person to obtain the random code.

12. The electronic apparatus of claim 7, wherein the preset account is an e-mail account, a social website account, an instant messaging account, or a phone number of a mobile phone of the user, wherein the mobile phone is different from the electronic apparatus.

* * * * *

UNITED STATES PATENT AND TRADEMARK OFFICE
CERTIFICATE OF CORRECTION

PATENT NO. : 9,569,611 B2  
APPLICATION NO. : 14/660945  
DATED : February 14, 2017  
INVENTOR(S) : Beryl Sun Page 1 of 1

It is certified that error appears in the above-identified patent and that said Letters Patent is hereby corrected as shown below:

On the Title Page

After Item (65) insert:
--(30) Foreign Application Priority Data
December 24, 2014 (CN) .......................201410818523.7--

Signed and Sealed this
Second Day of May, 2017

Michelle K. Lee
*Director of the United States Patent and Trademark Office*